(12) United States Patent
Yan

(10) Patent No.: US 12,541,474 B2
(45) Date of Patent: Feb. 3, 2026

(54) EVENT PROCESSING METHOD AND APPARATUS OF INPUT DEVICE

(71) Applicant: Honor Device Co., Ltd., Shenzhen (CN)

(72) Inventor: Jinbao Yan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/841,164

(22) PCT Filed: Aug. 29, 2023

(86) PCT No.: PCT/CN2023/115517
§ 371 (c)(1),
(2) Date: Aug. 23, 2024

(87) PCT Pub. No.: WO2024/046315
PCT Pub. Date: Mar. 7, 2024

(65) Prior Publication Data
US 2025/0190380 A1 Jun. 12, 2025

(30) Foreign Application Priority Data
Sep. 2, 2022 (CN) .......................... 202211071830.4

(51) Int. Cl.
*G06F 13/20* (2006.01)
(52) U.S. Cl.
CPC .......... *G06F 13/20* (2013.01); *G06F 2213/40* (2013.01)
(58) Field of Classification Search
CPC .............................. G06F 13/20; G06F 2213/40
See application file for complete search history.

(56) References Cited

U.S. PATENT DOCUMENTS

2014/0379946 A1 12/2014 Zhang et al.
2022/0006897 A1 1/2022 Kuang

FOREIGN PATENT DOCUMENTS

| CN | 103907078 A | 7/2014 |
| CN | 106980553 B | 7/2021 |
| CN | 113961131 A | 1/2022 |
| CN | 114527883 A | 5/2022 |

(Continued)

OTHER PUBLICATIONS

CN-114707004-A translation (Year: 2022).*
WO-2021190338-A1 Translation (Year: 2021).*

*Primary Examiner* — Henry Tsai
*Assistant Examiner* — John B Roche
(74) *Attorney, Agent, or Firm* — Leydig, Voit & Mayer, Ltd.

(57) ABSTRACT

An event processing method and apparatus of an input device are applied to the field of electronic technology. The method includes: detecting, by a first electronic device, a first event of an input device; determining a focus device; generating event information based on an event type of the first event and a first mapping relationship when the focus device is a second electronic device, where the event information includes a key scan code and a first event type, and the first mapping relationship includes a correspondence between the key scan code and a first key code; and transmitting event information to the second electronic device, where the event information is used for converting the first event into an event under a second operating system.

12 Claims, 9 Drawing Sheets

(56) References Cited

FOREIGN PATENT DOCUMENTS

| | | | | |
|---|---|---|---|---|
| CN | 114579016 A | | 6/2022 | |
| CN | 114707004 A | * | 7/2022 | ............. G06F 17/10 |
| WO | WO-2021190338 A1 | * | 9/2021 | ........ H04M 1/72454 |

* cited by examiner

EVENT PROCESSING METHOD AND APPARATUS OF INPUT DEVICE

CROSS-REFERENCE TO RELATED APPLICATIONS

This application is a national stage of International Application No. PCT/CN2023/115517, filed on Aug. 29, 2023, which claims priority to Chinese Patent Application No. 202211071830.4, filed on Sep. 2, 2022, both of which are hereby incorporated by reference in their entireties.

TECHNICAL FIELD

This application relates to the field of communication, and specifically, to a processing method and apparatus for an input device.

BACKGROUND

With the high-speed development of electronic devices, more multi-device collaboration scenarios across operating systems appear in people's lives. In a multi-device collaboration scenario across operating systems, there is a scenario in which different devices share a peripheral device (such as a mouse or a keyboard). Since there are differences between different operating systems, when a shortcut key operation is used on a peripheral device of a device, the shortcut key operation cannot be recognized and responded on a device of a different operating system, which severely affects operating efficiency of a user.

SUMMARY

In view of this, this application provides an event processing method and apparatus of an input device, a computer-readable storage medium, and a computer program product, enabling automatic conversion of a shortcut key event of the input device between different operating systems, thereby enabling a shortcut key to take effect between the different operating systems, improving operating efficiency, and greatly improving operating experience of a user.

In a first aspect, an event processing method of an input device is provided. The method is applied to a first electronic device, the first electronic device runs a first operating system, the first electronic device is connected to a second electronic device, the second electronic device runs a second operating system, the second operating system is different from the first operating system, and the method includes:
  detecting a first event of a first input device or a second input device, where the first electronic device is connected to the first input device, and the first electronic device is connected to the second input device:
  determining a current focus device of the first input device;
  generating event information based on an event type of the first event and a first mapping relationship when the focus device is the second electronic device, where the event information includes a key scan code and a first event type, the first mapping relationship includes a correspondence between the key scan code and a first key code, the key scan code is a corresponding key scan code of the first event under the second operating system, and the first key code is a key code of the first event under the first operating system; and
  transmitting the event information to the second electronic device, where the event information is used for converting the first event into an event under the second operating system.

The foregoing technical solution may be performed by the first electronic device (such as a personal computer (PC)) or a chip in the first electronic device (such as a chip in a PC). Based on the foregoing solution, if the first electronic device, after listening to a shortcut key event (such as the first event) of the input device, determines that the focus device is the second electronic device, the first electronic device converts the shortcut key event of the input device from the first operating system into event information that can be recognized by the second operating system, and transmits the event information to the second electronic device, so that the second electronic device responds to the event information, enabling automatic conversion of a shortcut key event of the input device between different operating systems, thereby enabling a shortcut key to take effect between the different operating systems, improving operating efficiency, and greatly improving operating experience of a user.

In some possible implementations, the transmitting the event information to the second electronic device includes: transmitting the event information to the second electronic device based on a first transmission format, where the first transmission format is a key event transmission format predefined by the first electronic device and the second electronic device.

Therefore, by transmitting the event information through the predetermined transmission format, it can be ensured that the counterpart (that is, the second electronic device) can parse out the event information.

In some possible implementations, the first input device is a mouse; and the first event is an event generated by a user by sliding a wheel of the mouse or clicking a mouse button. Therefore, for a mouse-related shortcut key event, the first electronic device may convert the mouse-related shortcut key event and transmit it to the second electronic device, so that the second electronic device responds.

In some possible implementations, the second input device is a keyboard; and the first event is an event generated by the user by operating a key in the key board (such as pressing and releasing the keyboard). Therefore, for a keyboard-related shortcut key event, the first electronic device may convert the keyboard-related shortcut key event and transmit it to the second electronic device, so that the second electronic device responds.

It can be understood that for a shortcut key event implemented by a combination of the keyboard and the mouse, the first electronic device may also convert and transmits it to the second electronic device, so that the second electronic device responds.

In some possible implementations, the method further includes: performing the first event in the first electronic device when the focus device is the first electronic device.

In some possible implementations, the first input device is a mouse; and the determining a focus device includes:
  determining a position of a cursor of the wireless mouse on a display screen of the first electronic device;
  the focus device being the second electronic device when the cursor of the wireless mouse is moved from the display screen of the first electronic device to a display screen of the second electronic device; and
  the focus device is the first electronic device when the cursor of the wireless mouse is located on the display screen of the first electronic device and there is no tendency to slide off the display screen of the first electronic device.

In some possible implementations, the first operating system is a Windows system, and the second operating system is an Android system. Therefore, this embodiment of this application can convert a shortcut key event under the Windows system into a shortcut key event under the Android system, to realize automatic conversion of the shortcut key event of the input device between the Windows operating system and the Android system.

In a second aspect, a connection method of an input device is provided. The method is applied to a second electronic device, the second electronic device runs a second operating system, the second electronic device is connected to a first electronic device, the first electronic device runs a first operating system, the second operating system is different from the first operating system, and the method includes:

receiving event information from the first electronic device, where the event information includes a key scan code and a first event type identifier, the key scan code is a corresponding key scan code of a first event under the second operating system, the first electronic device runs the first operating system, the first event is an event under the first operating system, and the first event is an event inputted by a first input device or a second input device and detected by the first electronic device;

obtaining the key scan code and a first event type identifier according to the event information; and responding based on the key scan code and the first event type identifier by invoking an interface.

In some optional implementations, the responding based on the key scan code and the first event type by invoking an interface includes: responding to the key scan code and the first event type by invoking a system interface.

Therefore, when the system has a related interface (such as an interface for a screen lock event), a response to a shortcut key event can be made by invoking the system interface without issuing to the application.

Exemplarily, the key scan code is a key code corresponding to a screen lock event shortcut key, and the first event type is a press key type; and the responding to the key scan code and the first event type by invoking a system interface includes: invoking a screen lock interface to lock a display screen of the electronic device.

In some optional implementations, the responding based on the key scan code and the first event type by invoking an interface includes: transmitting the key scan code and the first event type to an application program for responding by using an event distribution mechanism.

Therefore, an application program of the second electronic device is caused to respond to the shortcut key event by transmitting the key scan code and the first event type to the first application program.

Exemplarily, the key scan code includes a related shortcut key for a copy text event, and the first event type is a press key type; and the transmitting the key scan code and the first event type to an application program for responding by using an event distribution mechanism includes: transmitting the key scan code and the first event type to a first application program for responding, where the first application supports a duplicate text event, and the first application program is an application program that the electronic device is running.

In some possible implementations, the obtaining the key scan code and the first event type according to the event information includes: obtaining the key scan code and the first event type by parsing the event information based on a first transmission format, where the first transmission format is a key event transmission format predefined by the first electronic device and the second electronic device.

In some possible implementations, the first operating system is a Windows system, and the second operating system is an Android system. Therefore, this embodiment of this application can convert a shortcut key event under the Windows system into a shortcut key event under the Android system, to realize automatic conversion of the shortcut key event of the input device between the Windows operating system and the installation operating system.

In a third aspect, a communication system is provided. The communication system includes a first electronic device and a second electronic device. In some embodiments, the communication system further includes a first input device and a second input device. The first electronic device is configured to perform any method in the first aspect. The second electronic device is configured to perform any method in the second aspect.

In some embodiments, the first electronic device runs a first operating system, the second electronic device runs a second operating system, the second electronic device is connected to the first electronic device, and the second operating system is different from the first operating system.

In some embodiments, the first operating system is a Windows system, and the second operating system is an Android system.

In a fourth aspect, an event processing apparatus for an input device is provided, including a unit configured for performing any method in the first aspect. The apparatus may be a first electronic device (such as a PC device), or a chip in a first electronic device (such as a chip in a PC device). The apparatus includes an input unit, a display unit, and a processing unit.

In some embodiments, the apparatus runs a first operating system. Exemplarily, the first operating system is a Windows system.

When the apparatus is the first electronic device, the processing unit may be a processor, the input unit may be a communication interface, the display unit may be a graphic processing module and a screen; and the first electronic device may further include a memory, the memory is configured to store computer program code, and when the processor executes the computer program code stored in the memory, the first electronic device performs the method of any implementation in the first aspect.

When the apparatus is the chip in the first electronic device, the processing unit may be a logical processing unit inside the chip, the input unit may be an input interface, a pin, a circuit, or the like, and the display unit may be a graphics processing unit inside the chip: the chip may further include a memory, and the memory may be a memory inside the chip (such as a register and a cache), or a memory located outside the chip (such as a read-only memory and a random access memory); and the memory is configured to store computer program code, and when the processor executes the computer program code stored in the memory, the chip performs the method of any implementation in the first aspect.

In a fifth aspect, an event processing apparatus for an input device is provided, including a unit configured for performing any method in the second aspect. The apparatus may be a second electronic device (such as a tablet), or a chip in a second electronic device (such as a chip in a tablet). The apparatus includes an input unit, a display unit, and a processing unit.

In some embodiments, the apparatus runs a second operating system. Exemplarily, the second operating system is an Android system.

When the apparatus is the second electronic device, the processing unit may be a processor, the input unit may be a communication interface, the display unit may be a graphic processing module and a screen; and the second electronic device may further include a memory, the memory is configured to store computer program code, and when the processor executes the computer program code stored in the memory, the second electronic device performs the method of any implementation in the second aspect.

When the apparatus is the chip in the second electronic device, the processing unit may be a logical processing unit inside the chip, the input unit may be an input interface, a pin, a circuit, or the like, and the display unit may be a graphics processing unit inside the chip: the chip may further include a memory, and the memory may be a memory inside the chip (such as a register and a cache), or a memory located outside the chip (such as a read-only memory and a random access memory); and the memory is configured to store computer program code, and when the processor executes the computer program code stored in the memory, the chip performs the method of any implementation in the second aspect.

In a sixth aspect, a computer-readable storage medium is provided. The computer-readable storage medium stores computer program code, and when the computer program code is run by an event processing apparatus for an input device, the apparatus is caused to perform the method of any implementation in the second aspect, or the apparatus is caused to perform the method of any implementation in the second aspect.

In a seventh aspect, a computer program product is provided. The computer program product includes computer program code, and when the computer program code is run by an event processing apparatus for an input device, the apparatus is caused to perform the method of any implementation in the second aspect, or the apparatus is caused to perform the method of any implementation in the second aspect.

DESCRIPTION OF EMBODIMENTS

Figure 1:
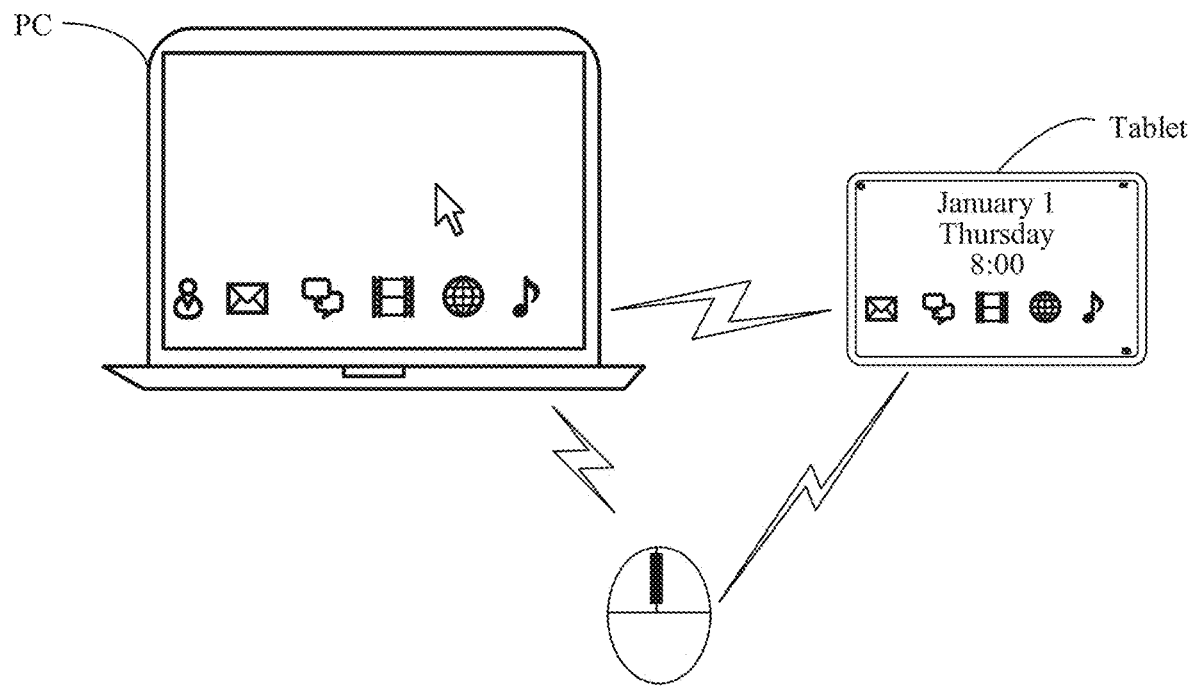
FIG. 1 is a diagram of an example of an application scenario according to an embodiment of this application.

The following describes technical solutions in embodiments of this application with reference to accompanying drawings.

An event processing method of an input device provided in embodiments of this application can be applied to an electronic device. For example, the electronic device may be an electronic device such as a tablet computer, a notebook computer, a wearable device, a multimedia playback device, an e-book reader, a personal computer (PC), a personal digital assistant (PDA), a netbook, an augmented reality (AR) device, a virtual reality (VR) device, a smartphone, a smart television, a smart screen device, a smart camera, a portable multimedia player (PMP), a projection device, a mixed reality (MR) device, a television, or a somatosensory game machine in a human-computer interaction scenario. This application constitutes no limitation on a specific form of the electronic device.

The electronic device generally may be connected to one or more input devices (such as input peripheral devices) to implement a corresponding function. It may be understood that the input device may be a wireless peripheral device or a wired peripheral device, which is not specifically limited.

Exemplarily, the wireless peripheral device is an input device performing input to a terminal device based on a wireless transmission protocol (such as a Bluetooth protocol or a 2.4G communication protocol). In embodiments of this application, an input manner supported by the input device may include, but not limited to, a button manner (such as a mouse or a key board), a scroll wheel manner (such as a mouse), a gesture input manner, a body language input manner, a voice input manner, an expression input manner, an eye activity input manner, or the like.

Further, embodiments of this application also constitute no limitation on a specific communication manner between the input device and the electronic device. Using an example in which the input device is a Bluetooth peripheral device, the Bluetooth peripheral device may communicate with the electronic device based on a Bluetooth protocol supporting an inter-device multi-connection protocol stack, to enable a plurality of electronic devices to share the input device.

For example, a personal computer PC may be connected to a mouse, to move a cursor on a display screen of the PC through the mouse and further realize functions such as opening/deleting a file. The PC may alternatively be connected to a keyboard, to implement functions such as moving a cursor on the display screen of the PC, inputting a character, and opening/deleting a file through the keyboard. In another example, a tablet computer may be connected to the keyboard, to implement functions such as inputting a character to the tablet computer and opening an application/video/audio in the tablet computer through the key board.

The event processing method of an input device provided in embodiments of this application may be applied to a multi-device collaboration scenario across operating systems. Exemplarily, the multi-device collaboration scenario across operating systems includes: a PC (running a Windows operating system) and a tablet (running an Android system), where a communication connection is established between the PC and the tablet. Assuming that a current focus device is the tablet, since operating systems are different, when an input peripheral device of the PC performs an operation using a shortcut key, the tablet cannot recognize a shortcut key event and cannot respond to the shortcut key event, greatly affecting operating efficiency and leading to poor user experience.

Exemplarily, the focus device is an electronic device that establishes a communication connection with the input device and can be directly controlled by the input device currently; and a non-focus device is an electronic device that establishes a communication connection with the input device but cannot be directly controlled by the input device currently. Using an example in which the input device is a wireless mouse and the wireless mouse is shared by the PC and the tablet, after the wireless mouse is moved to the PC, the focus device is the PC; and after the wireless mouse is moved to the tablet, the focus device is the tablet.

For ease of understanding, an application scenario of embodiments of this application is described below with reference to FIG. 1.

Referring to FIG. 1, FIG. 1 is a diagram of an example of an application scenario according to an embodiment of this application. As shown in FIG. 1, a wireless communication connection is established between a PC and a tablet. After the communication connection is established between the PC and the tablet, a mouse can freely move between the PC and the tablet. When a focus is at the tablet, the tablet can perform input through the mouse and a keyboard. However, the PC and the tablet adopt different operating systems. Therefore, when a user performs a shortcut key operation on the mouse and/or the key board of the PC, the tablet cannot respond to the shortcut key operation. That is, a shortcut key cannot function in this scenario, affecting the operation efficiency of the user.

It should be understood that embodiments of this application constitute no specific limitation on a connection manner between the PC and the tablet. The PC and the tablet may be connected through a Bluetooth, a wireless local area network, infrared, or the like.

To improve device operating experience across operating systems of the user, an embodiment of this application intends to propose an event processing method of an input device, which can implement automatic conversion of a shortcut key event of the input device between different operating systems by converting the shortcut key event of the input device under a first operating system into event information recognizable by a second operating system, so that the shortcut key takes effect between different operating systems.

Figure 2:
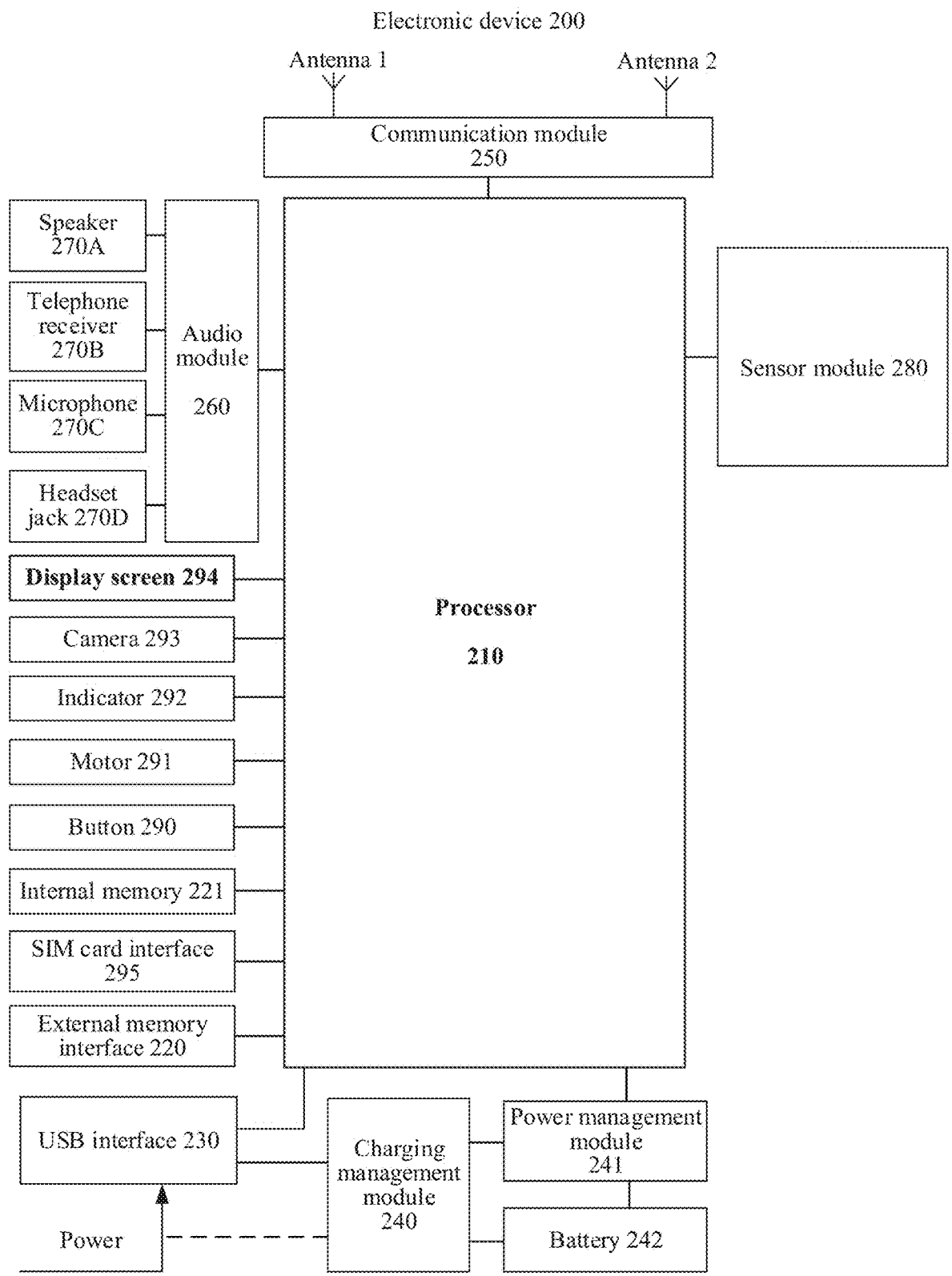
FIG. 2 is a schematic diagram of a hardware system of an electronic device to which this application is applicable.

FIG. 2 is a schematic diagram of a hardware structure of an electronic device according to an embodiment of this application. Exemplarily, a first electronic device may adopt the structure shown in FIG. 2. Exemplarily, a second electronic device may adopt the structure shown in FIG. 2.

As shown in FIG. 2, an electronic device 200 may include a processor 210, a memory (including an external memory interface 220 and an internal memory 221), a universal serial bus (USB) interface 230, a charging management module 240, a power management module 241, a battery 242, an antenna 1, an antenna 2, a communication module 250, an audio module 260, a speaker 270A, a telephone receiver 270B, a microphone 270C, a headset jack 270D, a sensor module 280, a button 290, a motor 291, an indicator 292, a camera 293, a display screen 294, and the like.

It may be understood that the schematic structure in FIG. 2 constitutes no specific limitation on the electronic device. In some other embodiments of this application, the electronic device may include more or fewer components than those shown in the figure, or some components may be combined, or some components may be split, or components are arranged in different manners. The illustrated components may be implemented by hardware, software, or a combination of software and hardware.

The processor 210 may include one or more processing units. For example, the processor 210 may include an application processor (AP), a modem processor, a graphics processing unit (GPU), an image signal processor (ISP), a flight controller, a video codec, a digital signal processor (DSP), a baseband processor, and/or a neural-network processing unit (NPU), and the like. Different processing units may be separate components, or may be integrated into one or more processors.

A memory configured to store instructions and data may be further disposed in the processor 210. In some embodiments, the memory in the processor 210 is a cache. The memory may store an instruction or data that is recently used or to be cyclically used by the processor 210. When needing to use the instruction or the data again, the processor 210 may directly invoke the instruction or the data from the memory. This avoids repeated accessing and reduces a wait time for the processor 210, thereby improving system efficiency.

In an embodiment of this application, the processor 210 may include one or more micro control units (MCUs) responsible for uniformly scheduling all other modules/timing/coordinated scheduling of transactions related to input device migration.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface.

The charging management module 240 is configured to receive a charging input from a charger. The power management module 241 is configured to connect to the battery 242, the charging management module 240, and the processor 210. The power management module 241 receives an input of the battery 242 and/or the charging management module 240, to supply power to the processor 210, the internal memory 221, the display screen 294, the camera 293, the communication module 250, and the like.

A wireless communication function of the electronic device may be implemented by using the antenna 1, the antenna 2, the communication module 250, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may further be reused to improve antenna utilization. For example, the antenna 1 may be reused as a diversity antenna of the wireless local area network. In some other embodiments, the antenna may be used in combination with a tuning switch.

The communication module 250 may provide a solution applied to the electronic device for wireless communication, including 2G/3G/4G/5G/6G and the like. The communication module 250 may include at least one filter, a switch, a power amplifier, a low noise amplifier (LNA), and the like. The communication module 250 may receive an electromagnetic wave via the antenna 1, perform processing such as filtering and amplification on the received electromagnetic wave, and transmit the electromagnetic wave to the modem processor for demodulation. The communication module 250 may further amplify a signal modulated by the modem processor. The amplified signal is converted into an electromagnetic wave and radiated out via the antenna 1. In some embodiments, at least some functional modules of the communication module 250 may be disposed in the processor 210. In some embodiments, at least some functional modules of the communication module 250) and at least some modules of the processor 210 may be disposed in a same component.

In some embodiments, the communication module 250 may further provide a solution applied to the electronic device for wireless communication, including a WLAN (such as a Wi-Fi network), a Bluetooth (BT), a global navigation satellite system (GNSS), frequency modulation (FM), a near field communication (NFC) technology, an infrared (IR) technology, and the like. The communication module 250 may be one or more components integrating at least one communication processor module. The communication module 250 receives an electromagnetic wave via the antenna 2, performs frequency modulation and filtering on the electromagnetic wave signal, and transmits the processed signal to the processor 210. The communication module 250) may further receive a to-be-transmitted signal from the processor 210, and perform frequency modulation and amplification on the signal. The amplified signal is converted into an electromagnetic wave and radiated out via the antenna 2.

In some embodiments, the communication module 250 may include a Bluetooth module. The Bluetooth module may be responsible for transmitting Bluetooth messages, which enables Bluetooth connection based interaction with a plurality of input devices.

The modem processor may include a modulator and a demodulator. The modulator is configured to modulate a to-be-transmitted low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal by using an audio apparatus (not limited to the speaker 270A, the phone receiver 270B, or the like), or displays an image or a video by using the display screen 294. In some embodiments, the modem processor may be an independent component. In some other embodiments, the modem processor may be independent of the processor 210, and the modem processor and the communication module 250 or another functional module may be disposed in the same component.

In embodiments of this application, the electronic device may communicate with other terminal devices based on the communication module 250, the antenna 1, and/or the antenna 2, for example, transmit a control instruction to other electronic devices.

In some embodiments, the antenna 1 and the communication module 250 of the electronic device are coupled, and the antenna 2 and the communication module 250 of the electronic device are coupled, so that the electronic device can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), a new radio (NR), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device implements a display function through the GPU, the display screen 294, the application processor, and the like. The GPU is a microprocessor for image processing, and is connected to the display screen 294 and the application processor. The GPU is configured to perform mathematical and geometric calculations and perform graphics rendering. The processor 210 may include one or more GPUs and execute program instructions to generate or change display information.

The display screen 294 is configured to display an image, a video, and the like. The display screen 294 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), and the like.

In some embodiments, the electronic device may perform interface rendering through the GPU, interface display through the display screen 294, or the like.

Exemplarily, in an embodiment of this application, the display screen 294 may display an interface including a cursor and a character entered by the input device.

The electronic device can implement a photographing function by using the ISP, the camera 293, the video codec, the GPU, the display screen 294, the application processor, and the like.

The external memory interface 220 may be configured to connect to an external storage card, such as a micro storage card (micro SD), to expand a storage capability of the electronic device. The external storage card communicates with the processor 210 by using the external memory interface 220, to implement a data storage function, such as storing a file such as music or a video in the external storage card.

The internal memory 221 may be configured to store executable program code of a computer program. Exemplarily, the computer program may include an operating system program and an application program. The operating system may include but is not limited to a Symbian system, an Android system, a Microsoft (Windows) system, an Apple iOS system, a Blackberry system, and other operating systems. The executable program code includes instructions. The internal memory 221 may include a program storage region and a data storage region. The program storage region may store an operating system, an application program required by at least one function, and the like. The data storage region may store data (such as application data and user data) and the like created when the electronic device is used. In addition, the internal memory 221 may include a high-speed random access memory, or may include a non-volatile memory such as at least one magnetic disk memory, a flash memory, or a universal flash storage (UFS). The processor 210 runs the instructions stored in the internal memory 221 and/or the instructions stored in the memory disposed in the processor, to implement various functional applications and data processing of the electronic device.

The sensor module 280 may perceive an operation of the user, such as a touch operation, a click operation, a swipe operation, and a user approaching a screen.

The electronic device may implement an audio function by using an audio module 260, a speaker 270A, a telephone receiver 270B, a microphone 270C, an application processor, and the like, for example, music playing or recording. For specific working principles and functions of the audio module 260, the speaker 270A, the telephone receiver 270B, and the microphone 270C, reference may be made to the introduction in the conventional art.

The button 290 includes a power button, a volume button, and the like. The button 290 may be a mechanical button, or may be a touch-type button. The electronic device may receive a button input, and generate a button signal input related to user setting and function control of the electronic device.

It should be noted that the hardware modules included in the electronic device shown in FIG. 2 are merely illustrative and constitute no limitation on the specific structure of the electronic device.

In embodiments of this application, the input device may include, but is not limited to, a wireless mouse, a wireless keyboard, a wireless trackball, a wireless touchpad, a wireless stylus, a wireless pen, a smart wearable device (such as a smart watch, a smart band, smart glasses, or a phone watch), a wireless headset, a gaming peripheral device, and the like, or any other device that may provide input to the electronic device, which is not limited in this application.

Figure 3:
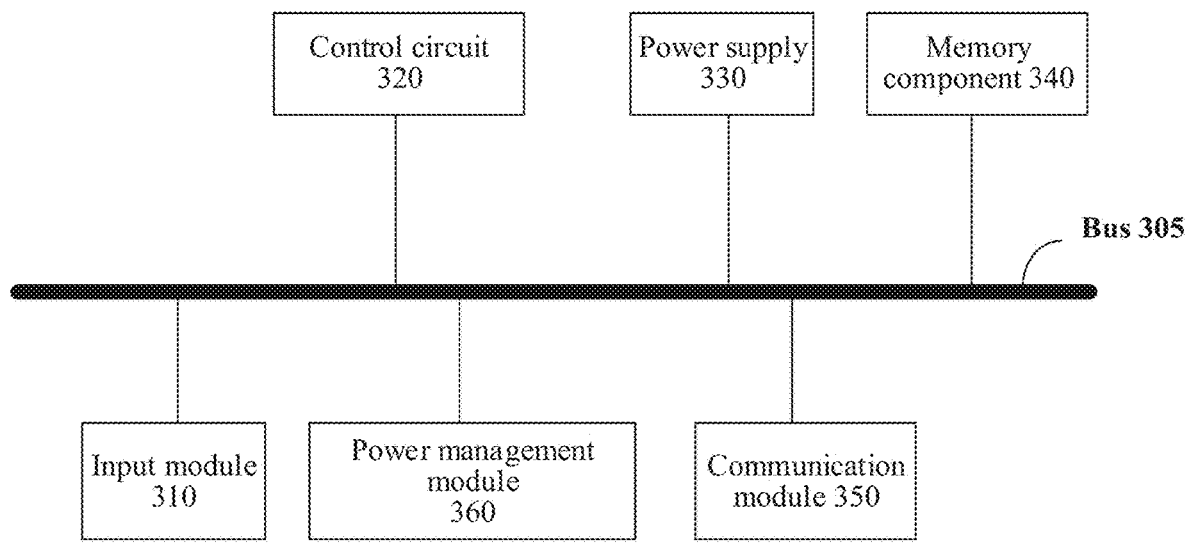
FIG. 3 is a schematic block diagram of a hardware structure of an input device to which this application is applicable.

FIG. 3 is a structural block diagram of an input device according to an embodiment of this application. As shown in FIG. 3, an input device 300 may include: a bus 305, an input module 310, a control circuit 320, a power supply 330, a memory component 340, a communication module 350, and a power management module 360.

The power supply 330 is configured to supply power to the input device 300. The power management module 360 may route power directly from the power supply 330 to other components of the input device 300. The power management module 360 may further distribute power from the power supply 330 to other system components (such as the control circuit 320, the communication module 350, and the input module 310, or any combination thereof).

In some embodiments, the control circuit 320, the power supply 330, the memory component 340, the communication module 350, and the power management module 360 may communicate with each other through the bus 305. The input module 310 may be independently connected to the control circuit 320 and the power management module 360.

In some embodiments, the input module 310 may be connected to other modules through the bus 305.

In some embodiments, the input module 310 may be configured to receive input from a plurality of key input elements or devices. In some embodiments, the input module 310 is operable to receive input in response to a user pressing a component, and the component includes: a key (such as a letter key, a function key (such as a volume key, an exit key, a mute key, or a shift key), a number key or a numeric keypad key, an operating system selection key, a right mouse button, or a left mouse button), or other suitable input elements or devices such as a media control button, a voice over Internet Protocol (VOIP) button, and a touch sensor (such as a touch pad and a touch pin). The input module 310 can generate character data associated with the pressed key input element and transmit the character data to the control circuit 320. Exemplarily, if the input device is a wireless keyboard, the input module 310 may include a key board key; and if the input device is a wireless mouse, the input module 310 may include a mouse sensor and a cursor module, where the cursor module is responsible for movement and input of a mouse cursor.

In an implementation of this application, a key code transmitted by the input device 300 to the electronic device depends on the operating system running on the electronic device. Behavior of the input device 300 depends on the operating system. Different key codes corresponding to the plurality of key input elements may be operating system specific. For example, selecting a "Home" key on different operating systems results in different functions (for example, a Home screen in iOS, but a Home page of a browser in Windows).

In some embodiments, the control circuit 320 may include one or more micro-processors, and the control circuit 320 may be configured to control an operation of the input device 300. The control circuit 320 may be responsible for coordinating scheduling of all other modules/timings/transactions uniformly, managing configuration information of the input device, managing migration of the input device, and the like. In some embodiments, the control circuit 320 may include one or more MCUs, digital signal processors (DSPs), field-programmable gate arrays (FPGAs), programmable logic devices (PLDs), and the like supporting hardware/firmware (such as a memory and a programmable input/output (I/O)).

The memory component 340 may be configured to store data. In some embodiments, the data may include connection data and pairing data, and the connection data and the pairing data include, for example, an address of a selected electronic device. In some embodiments, the memory component 340 may be a non-volatile memory.

The communication module 350 may be configured to provide an I/O capability to the input device 300. For example, the communication module 350 may route data from the input module 310 to a terminal device and data from the terminal device to the input module 310 through a wireless connection. The wireless connection may be a Bluetooth connection or a communication connection based on any other wireless standard or dedicated wireless network protocol. Exemplarily, the communication module 350 may include a Bluetooth module. The Bluetooth module may be responsible for transmitting Bluetooth messages, to implement Bluetooth connection interaction with the electronic device.

It should be noted that, the structure included in the input device 300 shown in FIG. 3 is merely illustrative and constitutes no limitation on a specific structure of the input device 300.

Figure 4:
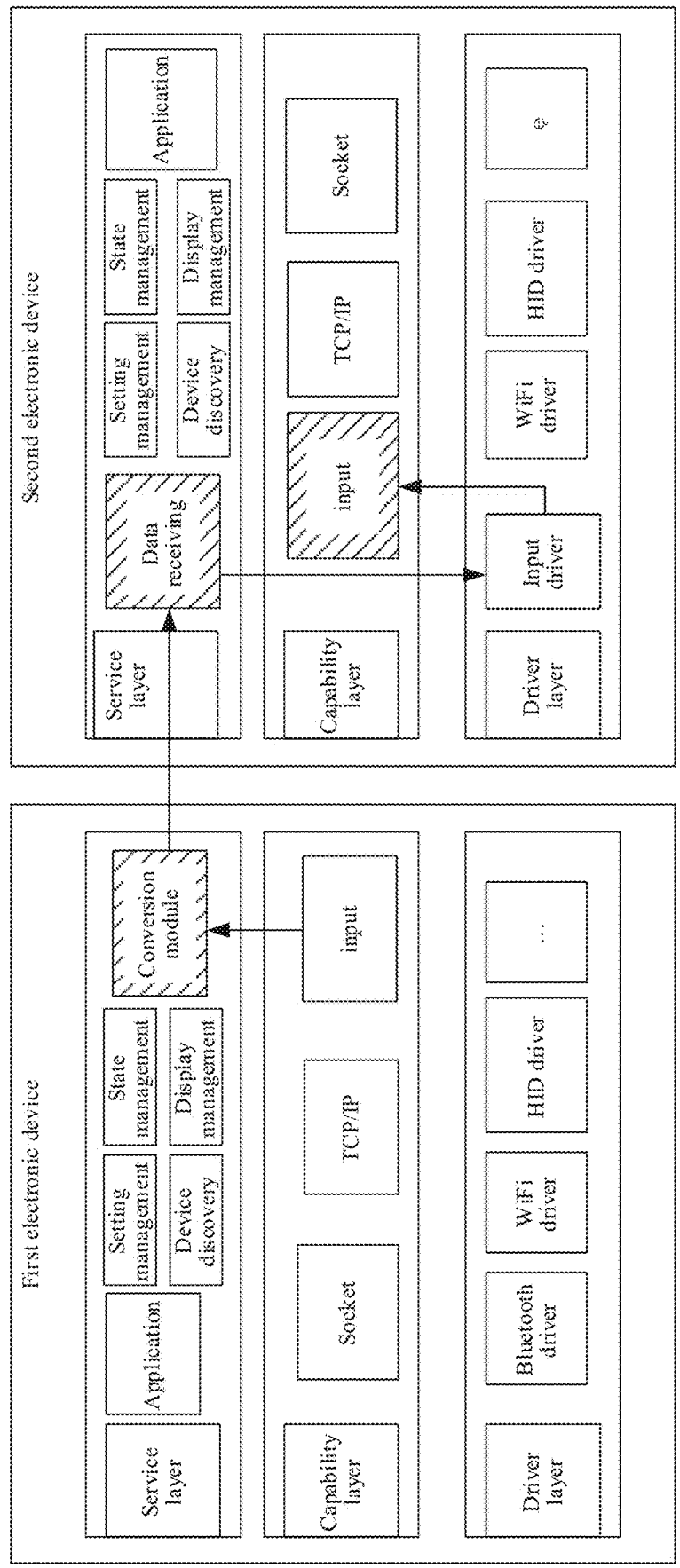
FIG. 4 is a schematic diagram of a software system of an electronic device to which this application is applicable.

FIG. 4 is a diagram of an example of a software architecture of a multi-device collaboration connection. As shown in FIG. 4, a communication connection is established between a first electronic device (also referred to as a collaboration device 1) and a second electronic device (also referred to as a collaboration device 2). The first electronic device adopts a first operating system. The second electronic device adopts a second operating system. The first operating system is different from the second operating system. For example, the first electronic device adopts a Windows system and the second electronic device adopts an Android system.

As shown in FIG. 4, the software architecture of the first electronic device is divided in sequence from top to bottom: a service layer (or an application layer), a capability layer (or an architecture layer), and a driver layer. The service layer includes the following modules: application, setting management (mainly used for managing setting of the first operating system), device discovery, state management (for example, used for managing a state of the first electronic device), and display management (for example, used for managing screen display content of the first electronic device). In an embodiment of this application, a conversion module (also referred to as an event listening conversion module) is newly added to the service layer. The conversion module is configured to listen to an input event of the input device. The conversion module is further configured to identify a focus device. The conversion module is further configured to convert the input event of the input device into event information of the second electronic device based on a first mapping relationship, and transmit the event information to a data receiving module of the second electronic device.

It should be understood that the modules included in the service layer of the first electronic device shown in FIG. 4 are merely exemplary description, and embodiments of this application are not limited thereto. In fact, the service layer of the first electronic device may include more or fewer modules than those shown in FIG. 4.

The capability layer includes the following modules: socket, TCP/IP, and an input module. The socket module is a basic operating unit that supports channel communication of a TCP/IP protocol.

The driver layer may include various types of driver modules. Exemplarily, for the first electronic device, the driver layer in FIG. 4 includes a Bluetooth driver, a Wi-Fi driver, an HID driver, and the like. It may be understood that the driver layer of the first electronic device in FIG. 4 may include more or fewer modules than those shown in FIG. 4, which is not specifically limited.

As shown in FIG. 4, the software architecture of the second electronic device is divided in sequence from top to bottom: a service layer (or an application layer), a capability layer (or an architecture layer), and a driver layer.

The service layer includes the following modules: application, setting management (for example, user for implementing setting management on the second operating system), device discovery (for example, used for implementing device discovery management on the second operating system), state management (for example, used for managing a state of the second electronic device), and display management (for example, used for managing screen display content of the second electronic device). In an embodiment of this application, a data receiving module is newly added to the service layer. The data receiving module is configured to receive the event information transmitted by the conversion module of the first electronic device. The data receiving module is further configured to parse the event information, and inject a key code and an event type that are obtained after parsing into an input driver.

It should be understood that the modules included in the service layer of the second electronic device shown in FIG. 4 are merely exemplary description, and embodiments of this application are not limited thereto. In fact, the service layer of the second electronic device may include more or fewer modules than those shown in FIG. 4.

The capability layer includes the following modules: an input module, a socket module, and TCP/IP. In an embodiment of this application, the input module in the service layer is modified. The input module is configured to invoke a corresponding shortcut function interface or distribute to an application for the event information (including the key code and the event type) injected into the input driver.

The driver layer may include various types of driver modules. Exemplarily, for the second electronic device, the drive layer in FIG. 4 includes an input driver, a Bluetooth driver, a Wi-Fi driver, an HID driver, and the like. The input driver reports the key code and the event type to the input module after obtaining the key code and the event type that are injected by the data receiving module. It may be understood that the driver layer of the second electronic device in FIG. 4 may include more or fewer modules than those shown in FIG. 4, which is not specifically limited.

It should be understood that the software architecture shown in FIG. 4 is merely an exemplary description and embodiments of this application are not limited thereto.

It may be understood that the schematic structure in FIG. 4 constitutes no specific limitation on the first electronic device or the second electronic device. In some other embodiments of this application, the first electronic device and the second electronic device may include more or fewer components than those shown in the figure, or some components may be combined, or some components may be split, or a different component arrangement is used. The illustrated components may be implemented by hardware, software, or a combination of software and hardware.

The event processing method of an input device according to an embodiment of this application is described below with reference to FIG. 5 to FIG. 8.

Figure 5:
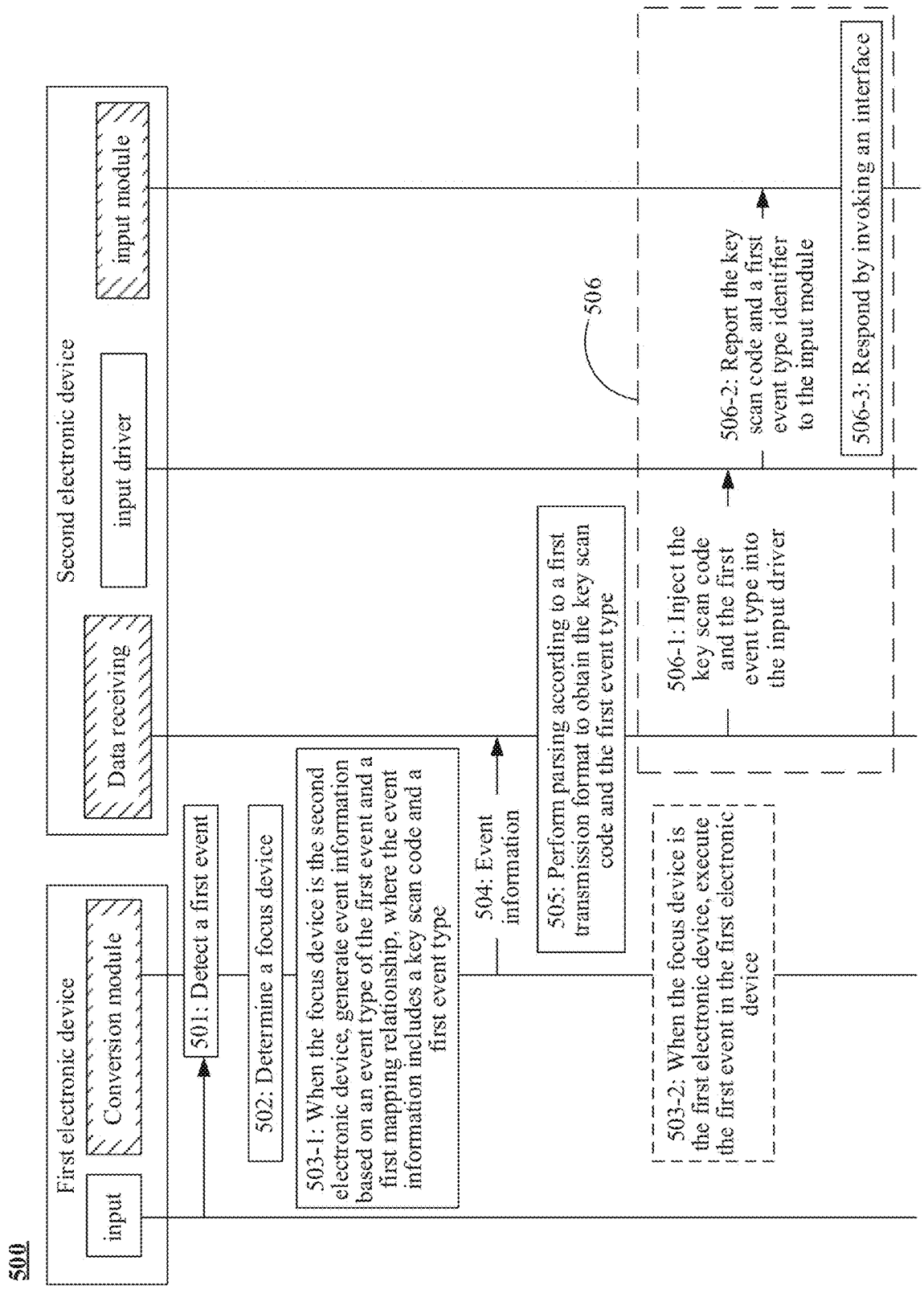
FIG. 5 is a schematic flowchart of an event processing method of an input device according to an embodiment of this application.

FIG. 5 is a schematic flowchart of an event processing method 500 of an input device according to an embodiment of this application. It can be understood that the method in FIG. 5 may be applied to the scenario shown in FIG. 1. For example, a first electronic device in FIG. 5 is the PC in FIG. 1, and a second electronic device is the tablet in FIG. 1. As shown in FIG. 5, the method 500 includes the following steps.

Step 501: A first electronic device detects a first event of a first input device or a second input device, where the first event is an event under a first operating system, the first electronic device is connected to the first input device, and the first electronic device is connected to the second input device.

The first event is used to generally refer to an input event of an input device listened by the first electronic device under the first operating system. The input event includes a shortcut key event. The shortcut key event is an event triggered by pressing a shortcut key of the input device. For example, a screen lock event may be triggered by pressing a Windows+L shortcut key may trigger.

Optionally, the first event may be an event triggered by the first input device and the second input device jointly, such as operation of a keyboard key plus a mouse wheel: or may be an event triggered by the first input device or the second input device alone, such as a mouse wheel slide event.

Exemplarily, the first input device is a wireless mouse and the second input device is a key board. The wireless mouse and the key board are connected to the first electronic device.

As uniformly described herein, the first electronic device and the second electronic device are electronic devices under different operating systems. A communication connection is established between the first electronic device and the second electronic device. For example, the first electronic device is a PC using a Windows system; and the second electronic device is a tablet computer using an Android system.

Embodiments of this application constitute no specific limitation on a communication connection manner between the first electronic device and the second electronic device. For example, the first electronic device and the second electronic device are connected through Bluetooth.

Exemplarily, the first electronic device detects an event of the first input device or the second input device, such as the first event, when the first electronic device listens to input events of various external devices (peripheral devices such as a keyboard and a mouse). The first event may be understood as an event under the first operating system. To execute the first event in the second electronic device, in this embodiment of this application, the first event needs to be converted into an event under the second operating system.

Step 502: The first electronic device determines a current focus device of the first input device.

After the first event is listened, whether the current focus device is the first electronic device or the second electronic device may be first determined. If it is determined that the focus device is the first electronic device, step 503-2 is performed; and if it is determined that the focus device is the second electronic device, step 503-1 is performed.

For description of the focus device, reference may be made to the foregoing content, which is not repeated herein for brevity.

Embodiments of this application constitute no specific limitation on a manner of determining the focus device.

Optionally, in an implementation, when the first input device is a wireless mouse, the determining a current focus device of the first input device includes:

determining a position of a cursor of the wireless mouse on a display screen of the first electronic device;

the focus device being the second electronic device when the cursor of the wireless mouse is moved from the display screen of the first electronic device to a display screen of the second electronic device; and the focus device being the first electronic device when the cursor of the wireless mouse is located on the display screen of the first electronic device and there is no tendency to slide off the display screen of the first electronic device.

Exemplarily, assuming that the first electronic device is located on a right side of the second electronic device, when it is detected that the cursor of the wireless mouse moves from a right edge of the display screen of the first electronic device to the second electronic device, it is determined that the focus device is the second electronic device; and when it is detected that the cursor of the wireless mouse is not beyond the right edge of the display screen of the first electronic device, it is determined that the focus device is the first electronic device.

Exemplarily, when the first electronic device detects that the wireless mouse slides out of an edge of the display screen of the first electronic device and movement coordinates of the wireless mouse sliding to the second electronic device exceeds a preset threshold, it is determined that the focus device is the second electronic device.

It should be understood that the foregoing manner of determining the focus device is merely an exemplary description and is not intended to limit embodiments of this application to the foregoing examples. In fact, a person skilled in the art can determine the focus device in other manners. For example, a screen cursor edge detection algorithm is used for detection.

Step 503-1: When the focus device is a second electronic device, the first electronic device generates event information based on an event type of the first event and a first mapping relationship, where the event information includes a key scan code and a first event type, the first mapping relationship includes a correspondence between a first key scan code and a first key code, the key scan code is a corresponding key code of the first event under a second operating system, and the first key code is a key code of the first event under the first operating system. The first event type identifier is used for identifying the event type of the first event.

The first mapping relationship may include a correspondence of key codes of the first event under different operating systems.

For example, Table 1 below is a mapping relationship between a key code of a screen lock event under the Windows system and a key scan code of the screen lock event under the Android system.

TABLE 1

| Screen Lock Event | Windows | Android |
| --- | --- | --- |
| Windows + L | 0x5B, 0x4C | 125, 38 |

In Table 1, for the screen lock event, the key code under the Windows system is 0x5B, 0x4C, and the corresponding key scan code under the Android system is 125, 38.

It should be understood that Table 1 is merely described using the screen lock event as an example, and embodiments of this application are not limited thereto. In fact, for other shortcut key events, the key code mapping relationship also exists, which is not listed one by one herein.

Exemplarily, keys corresponding to the 26 English alphabet letters have corresponding key scan codes under the Android system. For example, a key scan code for an alphabet A under the Android system is 30; a key scan code for an alphabet B under the Android system is 48: a key scan code for an alphabet C under the Android system is 46; . . . ; a key scan code for an alphabet X under the Android system is 45; a key scan code for an alphabet Y under the Android system is 21; and a key scan code for an alphabet Z under the Android system is 44. It should be understood that only key scan codes for some alphabets under the Android system are given herein as examples for brevity.

It should be understood that the keys described above for the 26 English alphabets also have corresponding key codes under the Windows system. For example, the keys of the 26 English alphabets can be converted to hexadecimal numbers for representation, to obtain key codes for the 26 English alphabets under the Windows system. In this case, the key code mapping relationship for the 26 English alphabets includes: a key code for an alphabet under the Windows system and a corresponding key scan code for the alphabet under the Android system.

Another key code mapping relationship is described below with reference to Table 2. For example, Table 2 shows a mapping table of corresponding key codes of some keys in the keyboard under the Windows system and corresponding key scan codes of the keys under the Android system.

TABLE 2

| Corresponding key in a keyboard | Corresponding key code under a Windows system | Corresponding key scan code under an Android system |
|---|---|---|
| ESC key | 0x1B | 1 |
| Grave key (Tilde key) | 0xC0 | 41 |
| TAB key | 0x09 | 15 |
| CAPSLOCK (Caps lock key) | 0x14 | 58 |
| Leftshift (Left shift key) | 0x10 | 42 |
| Leftshift (Left shift key) | 0xA0 | 42 |
| Rightshift (Right shift key) | 0xA1 | 54 |
| Leftctrl (Left ctrl key) | 0x11 | 29 |
| Leftctrl (Left ctrl key) | 0xA2 | 29 |
| Rightctrl (Right ctrl key) | 0xA3 | 97 |
| LeftAlt (Left Alt key) | 0x12 | 56 |
| LeftAlt (Left Alt key) | 0xA4 | 56 |
| RightAlt (Right Alt key) | 0xA5 | 100 |
| Windows key | 0x5B | 125 |

In Table 2, using the Windows key as an example, a corresponding key code under the Windows system is 0x5B and a corresponding key scan code under the Android system is 125.

It should be understood that Table 2 is described only using some keys in the keyboard as examples, and embodiments of this application are not limited thereto. In fact, for other keys, there is also a mapping relationship between key codes under the Windows system and key scan codes under the Android system, which is not listed one by one herein.

It should further be understood that the foregoing mapping relationship between the key code and the key scan code is merely exemplary and a person skilled in the art may add a key code mapping relationship as required or as specified by different operating systems.

Exemplarily, the first electronic device may maintain a mapping relationship of input devices (peripheral devices such as a keyboard and a mouse) under different operation systems. When the first electronic device listens to an event triggered by the input device, query may be performed in the mapping relationship to obtain a key scan code of the event under the Android system. After the key code is obtained, the first electronic device may encapsulate the key scan code and an event type into data (such as event information) for transmission to the second electronic device.

Optionally, the event type may be identified by an event ID. For example, in an encapsulation process, the event ID and the key scan code may be encapsulated and transmitted to the second electronic device.

A definition table of event types and event IDs is described below with reference to Table 3. For example, some event types and corresponding event IDs are shown in Table 3.

TABLE 3

| Event type | Event ID |
|---|---|
| Keyboard Down | GENERIC_INPUT_TYPE_KEY_DOWN |
| Keyboard Up | GENERIC_INPUT_TYPE_KEY_UP |
| Wheel vertical movement | GENERIC_INPUT_TYPE_VERTICAL_WHEEL |
| Wheel horizontal movement | GENERIC_INPUT_TYPE_HORIZONTAL_WHEEL |

In Table 3, Keyboard Down is an event in which the user has pressed a keyboard and has not released. For example, the keyboard Down event can be identified by GENERIC_INPUT_TYPE_KEY_Down. Keyboard Up is an event in which the user releases after pressing the keyboard. For example, the keyboard Up event can be identified by GENERIC_INPUT_TYPE_KEY_Up. A wheel vertical movement event is an event in which the user slides the mouse wheel to move vertically. For example, the wheel vertical movement event can be identified by GENERIC_INPUT_TYPE_VERTICAL_WHEEL. A wheel horizontal movement event is an event in which the user slides the mouse wheel to move horizontally. For example, the wheel horizontal movement event can be identified by GENERIC_INPUT_TYPE_HORIZONTAL_WHEEL.

It should be understood that the event types and the corresponding event IDs shown in Table 3 above are merely exemplary description, and embodiments of this application are not limited thereto.

It should also be understood that the above description regarding the event types and the corresponding event IDs is merely exemplary, and a person skilled in the art can add event types and corresponding event IDs as required.

Exemplarily, the screen lock event is implemented by two screen lock shortcut keys, such as a combination of a Windows key and an L key. When the user presses the Windows key, the first electronic device inquires a corresponding key scan code (125) of the Windows key under the Android system through the first mapping relationship, and then transmits a keyboard Down event and the corresponding key scan code (125) of the Windows key under the Android system to the second electronic device: then, when the user presses the L key, a "corresponding key scan code (38) of the L key under the Android system" and a "keyboard Down" event of the L key are transmitted to the second electronic device: after the user releases the L key, the first electronic device transmits the "corresponding key scan code (38) of the L key under the Android system" and a "keyboard UP" event of the L key to the second electronic device; and when the user releases the Windows key, a keyboard UP event and the corresponding key scan code (125) of the Windows key under the Android system are transmitted to the second electronic device.

Optionally, in step 503-2, when the focus device is the first electronic device, the first event is executed in the first electronic device.

Exemplarily, when it is detected that the mouse has not moved to an edge of the first electronic device (such as a right edge), the first event may be processed in the first electronic device. Optionally, that the first event is processed in the first electronic device includes: responding to the first event by using an original event procedure in the first electronic device. For example, the first event is distributed to another form (or window) of the first electronic device for processing.

Step 504: The first electronic device transmits the event information to the second electronic device, where the event information is used by the second electronic device to generate an event under the second operating system. Accordingly, the second electronic device receives the event information from the first electronic device.

Embodiments of this application constitute no specific limitation on a transmission format in which the first electronic device transmits the event information to the second electronic device.

Exemplarily, the first electronic device transmits the event information to the second electronic device based on a first transmission format (such as a format shown in Table 3), where the first transmission format is a key event transmission format predefined by the first electronic device and the second electronic device.

It should be noted that, the first transmission format is a transmission format agreed in advance by the first electronic device and the second electronic device. The second electronic device, after receiving the event information transmitted in the foregoing first transmission format, may parse the event information according to the first transmission format. Therefore, by transmitting the event information through the predetermined transmission format, it can be ensured that the counterpart (that is, the second electronic device) can parse out the event information.

It should be understood that the "first transmission format" is used to generally refer to a transmission format in which the first electronic device transmits the event information to the second electronic device, and a name thereof is not specifically limited in embodiments of this application. For example, the "first transmission format" may also be referred to as a "key event transmission format" or the like.

Exemplarily, the key event transmission format is described below with reference to Table 4. For example, an example of the key event transmission format is shown in Table 4:

TABLE 4

| Field type | Number of bytes |
| --- | --- |
| Identifier (id) | 1 byte |
| Length (length) | 2 bytes |
| Reserved (reserved) | 1 byte |
| keyCode (keyCode) 1 | 2 bytes |
| keyCode2 | 2 bytes |
| metaState | 4 bytes |
| timeStamp (timeStamp) | 4 bytes |

The number of bytes corresponding to each field is shown in Table 4 above. Based on the transmission format shown in Table 4 above, the key code and the event type can be encapsulated to obtain the event information.

It should be understood that the transmission format in Table 4 is only exemplary description, and embodiments of this application are not limited thereto. In fact, other transmission protocols or transmission formats may also be used by a person skilled in the art to transmit the foregoing event information.

Step 505: The second electronic device obtains the key scan code and the first event type (which may be identified by an event ID) according to the event information.

Exemplarily, if the first electronic device transmits the event information based on the first transmission format, correspondingly, the second electronic device, after receiving the event information, parses the event information based on the first transmission format, and obtains the key scan code and the first event type (for example, obtains the event ID).

The second electronic device may directly inject the key scan code and the first event type obtained through parsing into the input driver, or may perform mapping based on the key scan code and the first event type obtained through parsing and inject a mapped event type into the input driver.

Optionally, in an example, the second electronic device (or the data receiving module of the second electronic device), after obtaining the event type through parsing, may further map the event type obtained through parsing. For example, the first event type is mapped to a second event type, so that the event type more complies with usage specifications or standards under the second operating system, avoiding a case of failing to respond to the first event type when the first event type cannot be supported under the second operating system, and helping improve the operating experience of the user. Optionally, the second electronic device injects the mapped second event type into the input driver. For example, a shortcut key event parsed by the second electronic device includes: pressing a "Windows+Left Direction Key (that is, Left Arrow Key)". The "Windows+Left Direction Key" is "an event of maximizing a window to a left side of a screen" under the Windows system, but there is no corresponding event type under the Android system. Therefore, the second electronic device maps this event "Windows+Left Direction Key" as a "Return" event, and injects the "Return" event into the input driver.

It should be understood that embodiments of this application constitute no specific limitation on how the second electronic device maps the parsed event. A person skilled in the art can perform corresponding mapping based on an actual requirement.

Step 506: The second electronic device invokes an interface to respond based on the key scan code and the first event type (identified by a first event type ID).

Exemplarily, Step 506 includes the following steps. 506-1: A data receiving module of the second electronic device injects the key scan code and the first event type into an input driver. 506-2: The input driver reports the key scan code and the first event type to an input module. Step 506-3: The input module invokes an interface to respond according to the key scan code and the first event type. Exemplarily, the input module may convert the key scan code into a key code under the Android system.

Exemplarily, the input module in the second electronic device, according to the key scan code and the first event type, invokes a corresponding function interface, or distributes the shortcut key event to an application. This will be described later with reference to examples.

In embodiments of this application, if the first electronic device, after listening to the shortcut key event (such as the first event) of the input device, determines that the focus device is the second electronic device, the first electronic device converts the shortcut key event of the input device under the first operating system into event information that can be recognized by the second operating system, and transmits the event information to the second electronic device, so that the second electronic device responds to the event information. In this way, automatic conversion of the shortcut key event of the input device between different operating systems can be implemented, thereby enabling a shortcut key to take effect between the different operating systems, improving the operating efficiency, and greatly improving the operating experience of the user.

Optionally, in an embodiment, the responding based on the key scan code and the first event type by invoking an interface includes: responding to the key scan code and the first event type by invoking a system interface.

Exemplarily, the key scan code is a key code corresponding to a screen lock event shortcut key, and the first event type is a press key type; and the responding to the key scan code and the first event type by invoking a system interface includes: invoking a screen lock interface to lock a display screen of the electronic device.

For example, there is a corresponding screen lock interface under the Android system. In this case, there is no need to distribute the event information to the application.

Optionally, if the second electronic device maps the key scan code and/or the first event type, the second electronic device may invoke a system interface to respond to a mapped key code (for example, a third key code) and a mapped event type (for example, a second event type).

Figure 6:
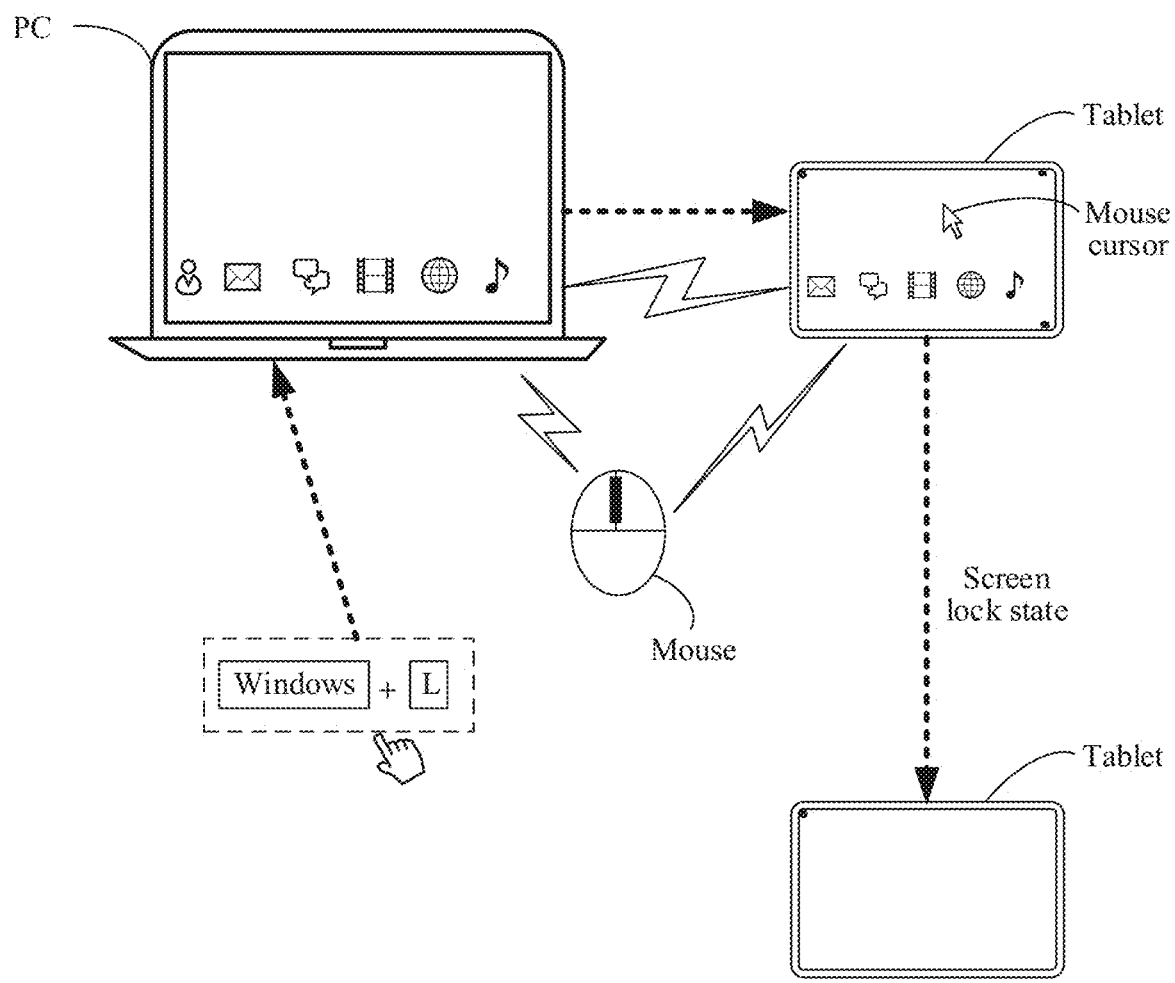
FIG. 6 is a diagram of an example of a shortcut key event according to an embodiment of this application.

For ease of understanding, the following is described with reference to the example in FIG. 6. In a possible implementation, using an example in which the first electronic device is a PC and the second electronic device is a tablet, and the PC and the tablet share a mouse, as shown in FIG. 6, the PC and the tablet are connected. In FIG. 6, a mouse cursor is in the tablet, that is, a current focus device is the tablet. The user may trigger a screen lock event by pressing a screen lock shortcut key (including a Windows key and an L key). The PC, after detecting the screen lock event, converts the screen lock event into a key code and an event type under the tablet. As shown in FIG. 6, after the user presses the Windows key and the L key, the tablet invokes a system interface to implement screen locking, that is, the tablet is turned off. As can be seen in FIG. 6, the tablet responds to the screen lock shortcut key event.

Optionally, in an embodiment, the responding based on the key scan code and the first event type by invoking an interface includes: including: transmitting the key scan code and the first event type to an application program for responding by using an event distribution mechanism.

Exemplarily, the key scan code includes a key code of a related shortcut key (such as a ctrl key in a copy shortcut key) of a text copy event, and the first event type is a type of a pressed key (such as a pressed ctrl key). The transmitting the key scan code and the first event type to an application program for responding by using an event distribution mechanism includes: transmitting the key scan code and the first event type to a first application program for responding, where the first application supports a duplicate text event, and the first application program is an application program that the electronic device is running.

Optionally, if the second electronic device maps the key scan code and/or the first event type, the event distribution mechanism may be used to respond to the mapped key scan code and the mapped event type.

Figure 7:
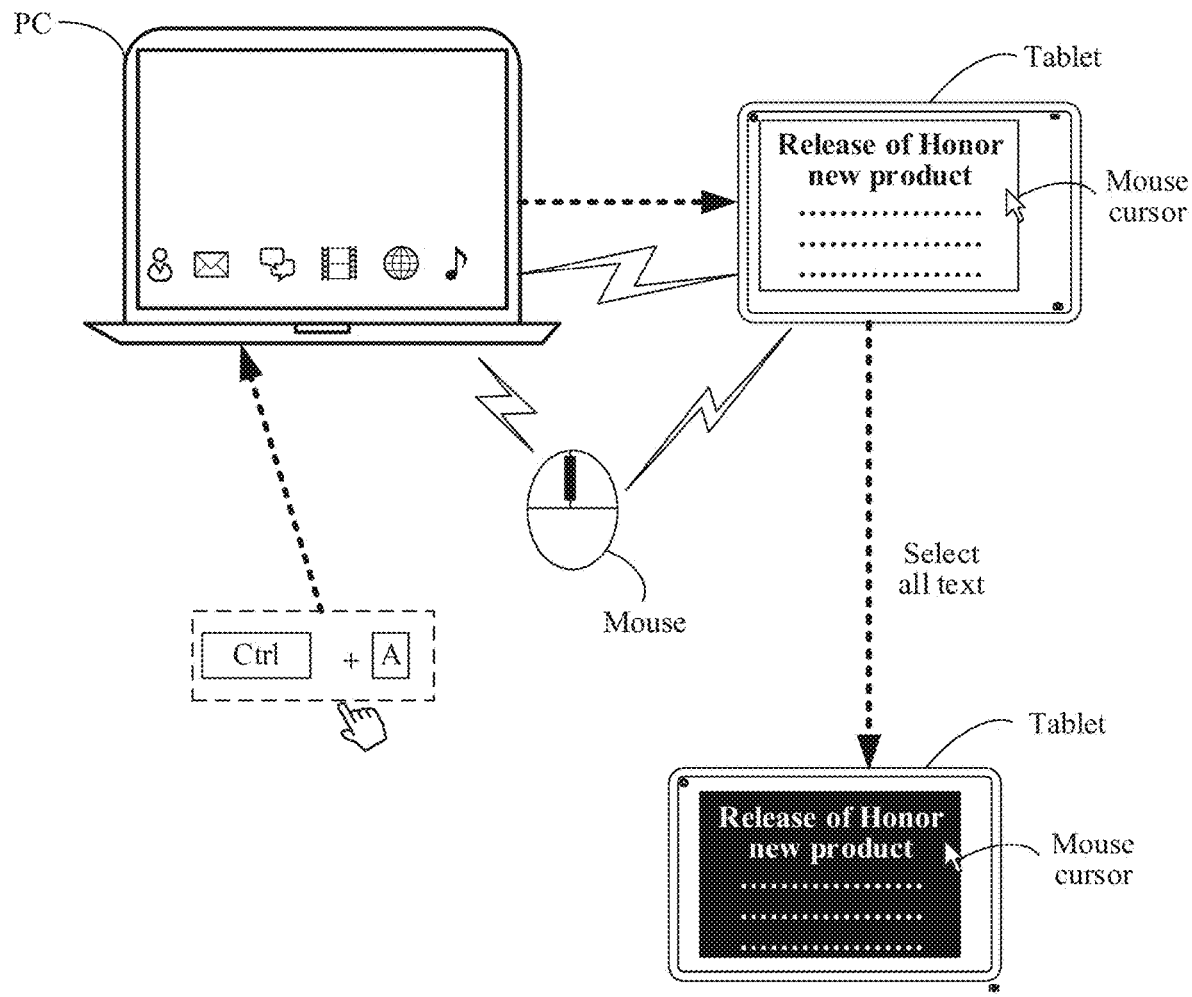
FIG. 7 is a diagram of an example of another shortcut key event according to an embodiment of this application.

For ease of understanding, the following is described with reference to the example in FIG. 7. In a possible implementation, using an example in which the first electronic device is a PC, the second electronic device is a tablet, and the PC and the tablet share a mouse, as shown in FIG. 7, the PC and the tablet are connected. In FIG. 7, a mouse cursor is in the tablet, that is, a current focus device is the tablet. The user may trigger a text all-select event by pressing a text all-select shortcut key (including a ctrl key and an A key). The PC, after detecting the text all-select event, converts the text all-select event into a key code and an event type under the tablet. As shown in FIG. 7, when the user presses the ctrl key and the A key, the tablet distributes the text all-select event to an application. Assuming that the tablet is currently running a text-type application, an interface of the text-type application is invoked to implement the text all-select event, such as selecting text "Release of Honor new product . . . " currently displayed by tablet. As can be seen from FIG. 7, the tablet responds to the text all-select event shortcut key event.

It should be understood that the example in FIG. 7 is merely an example of the "text all-select shortcut key event", and embodiments of this application are not limited thereto.

It should be understood that the examples shown in FIG. 6 and FIG. 7 relate to shortcut key operations of a keyboard, and embodiments of this application are not limited thereto. In fact, the user may also implement some shortcut key events through a keyboard and a mouse together.

Figure 8:
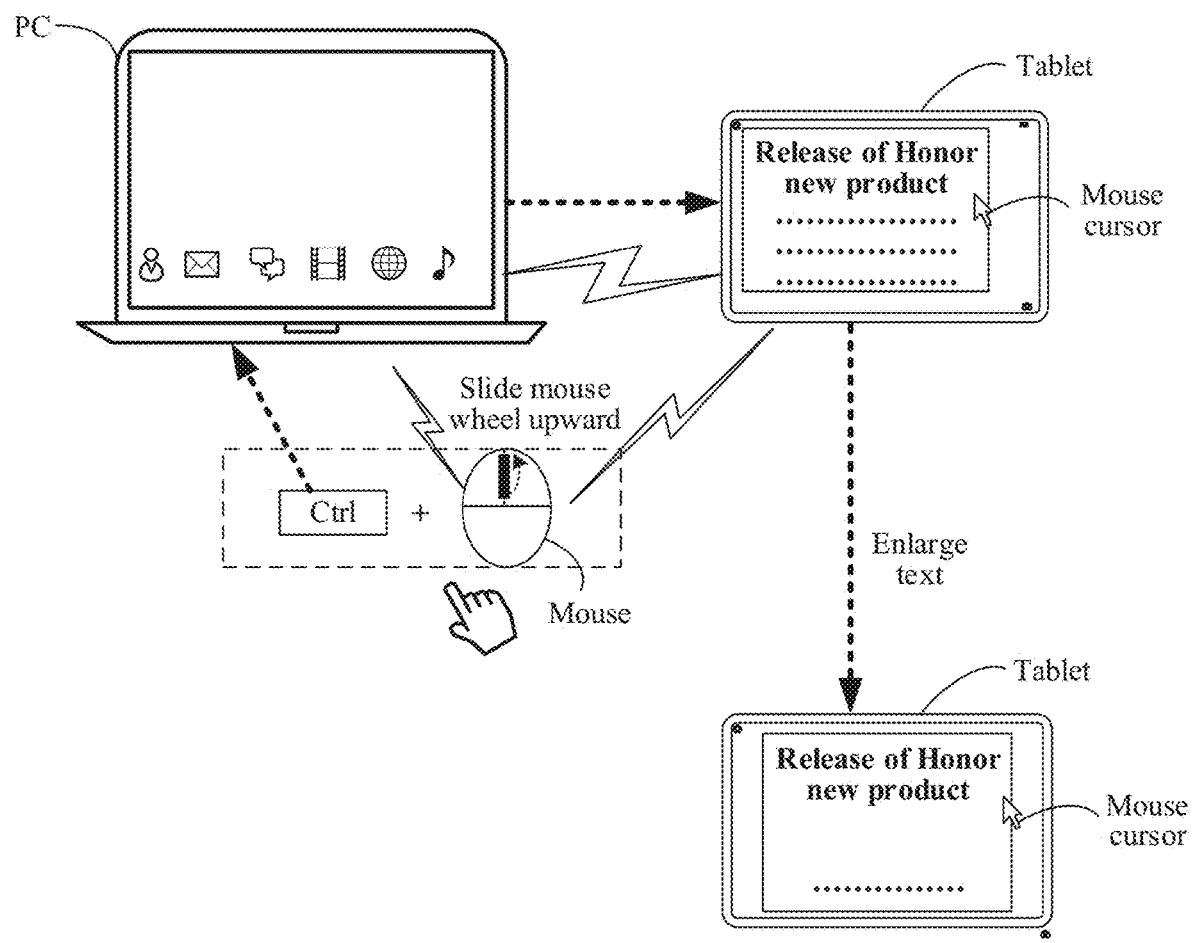
FIG. 8 is a diagram of an example of still another shortcut key event according to an embodiment of this application.

FIG. 8 is a diagram of an example of enlarging text through a keyboard and a mouse together. Using an example in which the first electronic device is a PC, the second electronic device is a tablet, and the PC and the tablet share a mouse, as shown in FIG. 8, the PC and the tablet are connected. In FIG. 8, a mouse cursor is in the tablet, that is, a current focus device is the tablet. The user may trigger a text enlarge event by pressing a text enlarge shortcut key (including a ctrl key and sliding mouse wheel upward. The PC, after detecting the text enlarge event, converts the text enlarge event into a key code and an event type under the tablet. As shown in FIG. 8, when the user presses the ctrl key and simultaneously slides the mouse wheel upward, the tablet distributes the text enlarge event to an application. Assuming that the tablet is currently running a text-type application, an interface of the text-type application is invoked to implement the text enlarge event, such as enlarging text "Release of Honor new product . . . " currently displayed by the tablet. As can be seen from FIG. 8, the tablet responds to the text enlarge event shortcut key event.

It should be understood that the examples in FIG. 6 to FIG. 8 are merely exemplary description of some shortcut key events, and embodiments of this application are not limited thereto. In fact, other shortcut key events can also be responded across systems using the method of embodiments of this application.

It should also be understood that FIG. 6 to FIG. 8 are described by only using an example in which the PC is the first electronic device and the tablet is the second electronic device, and embodiments of this application are not limited thereto. For example, the tablet may be used as the first electronic device and the PC may be used as the second electronic device to implement the method.

The event processing method of an input device provided in embodiments of this application is described in detail above with reference to FIG. 1 to FIG. 8. Apparatus embodiments of this application are described in detail below with reference to FIG. 9 and FIG. 10. It should be understood that, the event processing apparatus for an input device in embodiments of this application may perform various event processing methods of an input device in the foregoing embodiments of this application, that is, for specific working processes of the following products, refer to corresponding processes in the foregoing method embodiments.

Figure 9:
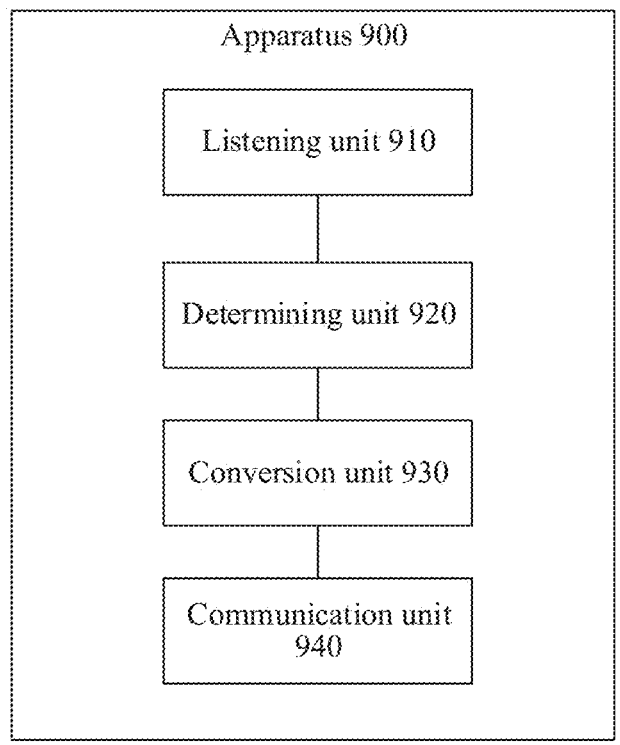
FIG. 9 is a schematic block diagram of an event processing apparatus for an input device according to an embodiment of this application.

FIG. 9 is a schematic block diagram of an event processing apparatus 900 for an input device according to an embodiment of this application. It should be understood that the apparatus 900 may perform the methods performed by the first electronic device in the event processing of the input device illustrated in FIG. 5 to FIG. 8.

As shown in FIG. 9, the event processing apparatus 900 for an input device includes: a listening unit 910, a determining unit 920, a conversion unit 930, and a communication unit 940. In a possible example, the apparatus 900 may be the first electronic device, such as a PC device. The first electronic device runs a first operating system, the first electronic device is connected to a second electronic device, the second electronic device runs a second operating system, and the second operating system is different from the first operating system.

The listening unit 910 is configured to detect a first event of a first input device or a second input device, where the first electronic device is connected to the first input device, and the first electronic device is connected to the second input device:

the determining unit 920 is configured to determine a current focus device of the first input device;

the conversion unit 930 is configured to generate event information based on an event type of the first event and a first mapping relationship when the focus device is the second electronic device, where the event information includes a key scan code and a first event type, the first mapping relationship includes a correspondence between the key scan code and a first key code, the key scan code is a corresponding key scan code of the first event under the second operating system, and the first key code is a key code of the first event under the first operating system; and the communication unit 940 is configured to transmit the event information to the second electronic device, where the event information is used for converting the first event to an event under the second operating system.

Optionally, in an embodiment, that the communication unit 940 is configured to transmit the event information to the second electronic device includes: transmitting the event information to the second electronic device based on a first transmission format, where the first transmission format is a key event transmission format predefined by the first electronic device and the second electronic device.

Optionally, in an embodiment, the first input device is a mouse; and the first event is an event generated by a user by sliding a scroll wheel of the mouse or clicking a mouse button.

Optionally, in an embodiment, the second input device is a key board. The first event is an event generated by the user by pressing a key in the key board.

Optionally, in an embodiment, the apparatus 900 further includes: a processing unit (not shown in FIG. 9). The processing unit is configured to execute the first event in the first electronic device when the focus device is the first electronic device.

Optionally, in an embodiment, the first input device is a mouse; and that the determining unit 920 is configured to determine a focus device specifically includes:

determining a position of a cursor of the wireless mouse on a display screen of the first electronic device;

the focus device being the second electronic device when the cursor of the wireless mouse is moved from the display screen of the first electronic device to a display screen of the second electronic device; and the focus device is the first electronic device when the cursor of the wireless mouse is located on the display screen of the first electronic device and there is no tendency to slide off the display screen of the first electronic device.

Optionally, in an embodiment, the first operating system is a Windows system, and the second operating system is an Android system.

In a possible example, the listening unit 910, the determining unit 920, the conversion unit 930, and the communication unit 940 may be implemented through a processor or a processing unit. It should be understood that the apparatus 900 is represented in a form of a functional unit. The term "unit" herein can be implemented in the form of software and/or hardware, which is not specifically limited in embodiments of this application.

For example, the "unit" may be a software program, a hardware circuit, or a combination thereof for implementing the foregoing function. The hardware circuit may include an application specific integrated circuit (ASIC), an electronic circuit, a processor (for example, a shared processor, a dedicated processor, or a group processor) configured to execute one or more software or firmware programs and a memory, an integrated logic circuit, and/or another suitable component that supports the foregoing functions. In a simple embodiment, a person skilled in the art may figure out that the apparatus 900 may be in a form shown in FIG. 2.

Figure 10:
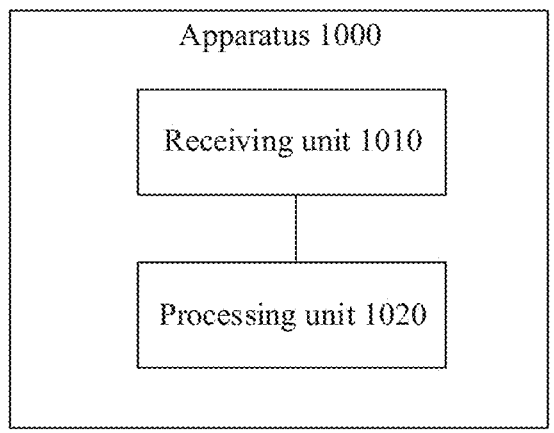
FIG. 10 is another schematic block diagram of an event processing apparatus for an input device according to an embodiment of this application.

FIG. 10 is a schematic block diagram of an event processing apparatus 1000 for an input device according to an embodiment of this application. It should be understood that the apparatus 1000 may perform the methods performed by the second electronic device in the event processing of the input device illustrated in FIG. 5 to FIG. 8.

As shown in FIG. 10, the event processing apparatus 1000 for an input device includes: a receiving unit 1010 and a processing unit 1020. In a possible example, the apparatus 1000 may be the second electronic device, such as a tablet. The second electronic device runs a second operating system, the second electronic device is connected to a first electronic device, the first electronic device runs a first operating system, and the second operating system is different from the first operating system.

In some examples, the receiving unit 1010 is configured to receive event information from the first electronic device, where the event information includes a key scan code and a first event type identifier, the key scan code is a corresponding key scan code of a first event under the second operating system, the first electronic device runs the first operating system, the first event is an event under the first operating system, and the first event is an event inputted by a first input device or a second input device and detected by the first electronic device:

the processing unit 1020 is configured to obtain the key scan code and the first event type identifier according to the event information; and the processing unit 1020 is further configured to respond based on the key scan code and the first event type identifier by invoking an interface.

Optionally, in an embodiment, that the processing unit 1020 is configured to respond based on the key scan code and the first event type identifier by invoking an interface specifically includes: responding to the key scan code and the first event type by invoking a system interface.

Optionally, in an embodiment, the key scan code is a key code corresponding to a screen lock event shortcut key, and the first event type is a press key type; and the responding to the key scan code and the first event type by invoking a system interface includes: invoking a screen lock interface to lock a display screen of the electronic device.

Optionally, in an embodiment, that the processing unit 1020 is configured to respond based on the key scan code and the first event type by invoking an interface specifically includes: transmitting the key scan code and the first event type to an application program for responding by using an event distribution mechanism.

Optionally, in an embodiment, the key scan code includes a related shortcut key for a copy text event, and the first event type is a press key type; and the transmitting the key scan code and the first event type to an application program for responding by using an event distribution mechanism includes: transmitting the key scan code and the first event type to a first application program for responding, where the first application supports a duplicate text event, and the first application program is an application program that the electronic device is running.

Optionally, in an embodiment, that the processing unit 1020 is configured to obtain the key scan code and the first event type according to the event information includes: obtaining the key scan code and the first event type by parsing the event information based on a first transmission format, where the first transmission format is a key event transmission format predefined by the first electronic device and the second electronic device.

Optionally, in an embodiment, the first operating system is a Windows system, and the second operating system is an Android system.

In a possible example, the receiving unit 1010 can be implemented through a wireless communication module. The processing unit 1020 can be implemented through a processor or a processing unit. It should be understood that the apparatus 1000 is represented in a form of a functional unit. The term "unit" herein can be implemented in the form of software and/or hardware, which is not specifically limited in embodiments of this application.

For example, the "unit" may be a software program, a hardware circuit, or a combination thereof for implementing the foregoing function. The hardware circuit may include an application specific integrated circuit (ASIC), an electronic circuit, a processor (for example, a shared processor, a dedicated processor, or a group processor) configured to execute one or more software or firmware programs and a memory, an integrated logic circuit, and/or another suitable component that supports the foregoing functions. In a simple embodiment, a person skilled in the art may figure out that the apparatus 1000 may be in a form shown in FIG. 2.

A person of ordinary skill in the art may notice that the exemplary units and algorithm steps described with reference to embodiments disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The application further provides a communication system, including a first electronic device, a second electronic device, and a plurality of input devices.

This application further provides a computer program product, the computer program product, when executed by a processor, implementing the method described in any method embodiment in this application.

The computer program product may be stored in a memory and finally converted into an executable target file capable of being executed by a processor through processes such as pre-processing, compilation, assembly, and linking.

This application further provides a computer-readable medium. The computer-readable medium stores a computer program. When the computer program is executed by a computer, a method of any method embodiment is implemented. The computer program may be a high-level language program or may be an executable target program.

The computer-readable storage medium may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through illustrative but not limited description, many forms of RAMs may be used, for example, a static random access memory (static RAM, SRAM), a dynamic RAM (dynamic RAM, DRAM), a synchronous DRAM (synchronous DRAM, SDRAM), a double data rate SDRAM (double data rate SDRAM, DDR SDRAM), an enhanced synchronous dynamic random access memory (enhanced SDRAM, ESDRAM), a synchronous link DRAM (synchlink DRAM, SLDRAM), and a direct rambus RAM (direct rambus RAM, DR RAM).

A person of ordinary skill in the art may notice that the exemplary units and algorithm steps described with reference to embodiments disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes various media that can store program code, such as a USB flash drive, a removable hard disk, a read-only memory ROM, a random access memory RAM, a magnetic disk, or an optical disc.

It should be understood that sequence numbers of the foregoing processes do not mean execution sequences in various embodiments of this application. The execution sequences of the processes should be determined based on functions and internal logic of the processes, and should not be construed as any limitation on implementation processes of embodiments of this application.

In addition, the terms "system" and "network" may be used interchangeably in this specification. The term "and/or" in this specification is merely an association relationship for describing an associated object, and indicates that three relationships may exist. For example, A and/or B may represent: only A exists, both A and B exist, and only B exists. In addition, the character "/" in this specification generally indicates an "or" relationship between the associated objects. For example, A/B may represent A or B.

The terms (or numbers) "first", "second", and the like appearing in embodiments of this application are only for descriptive purposes, that is, only to distinguish different objects, such as different "electronic devices", which is not to be understood as indicating or implying the relative importance, or implying or indicating an indication of a quantity of technical features indicated. Therefore, a feature limited by "first", "second", and the like may explicitly or implicitly include one or more of the features. In the description of embodiments of this application, "at least one (item)" means one or more. "A plurality of" means two or more. "At least one (item) of the following" and similar expressions mean any combination of these items, including any combination of a single item or a plurality of items.

For example, appearances in embodiments of the present application similar to the expression "an item includes at least one of A, B, or C", unless specifically stated otherwise, generally mean that the item can be any of the following: A: B: C: A and B; A and C: B and C: A, B, and C: A and A: A, A and A: A, A and B; A, A and C, A, B, and B; A, C and C; B and B, B, B, and B, B, B, and C, C and C; and C, C, and C, and other combinations of A, B, and C. Optional entries for the item are described above in terms of 3 elements of A, B, and C, and when expressed as "an item includes at least one of the following: "A, B . . . , and X", that is, when there are more elements in the expression, then the entries to which the item can be applied can also be obtained according to the foregoing rules.

In conclusion, what are described above are merely examples of embodiments of the technical solutions of this application, but are not intended to limit the protection scope of this application. Any modification, equivalent replacement, or improvement made without departing from the spirit and the principle of this application shall fall within the protection scope of this application.

The invention claimed is:

1. An event processing method of an input device, wherein a first electronic device runs a first operating system, the first electronic device is connected to a second electronic device, the second electronic device runs a second operating system, the second operating system is different from the first operating system, and the method comprises:

detecting, by the first electronic device, a first event of a first input device or a second input device, wherein the first electronic device is connected to the first input device, and the first electronic device is connected to the second input device;

determining, by the first electronic device, a current focus device of the first input device;

generating, by the first electronic device, event information based on an event type of the first event and a first mapping relationship based on the focus device being the second electronic device, wherein the event information comprises a key scan code and a first event type, the first mapping relationship comprises a correspondence between the key scan code and a first key code, the key scan code is a corresponding key scan code of the first event under the second operating system, and the first key code is a key code of the first event under the first operating system; and transmitting, by the first electronic device, the event information to the second electronic device, wherein the event information is used for converting the first event into an event under the second operating system.

2. The method according to claim 1, wherein the transmitting the event information to the second electronic device comprises:

transmitting, by the first electronic device, the event information to the second electronic device based on a first transmission format, wherein the first transmission format is a key event transmission format predefined by the first electronic device and the second electronic device.

3. The method according to claim 1, wherein the method further comprises:

executing the first event in the first electronic device when the focus device is the first electronic device.

4. The method according to claim 1, wherein the first operating system is a Windows system, and the second operating system is an Android system.

5. The method according to claim 1, wherein the method further comprises:

receiving, by the second electronic device, the event information from the first electronic device;

obtaining, by the second electronic device, the key scan code and the first event type according to the event information; and responding, by the second electronic device, based on the key scan code and the first event type by invoking an interface.

6. The method according to claim 5, wherein the responding based on the key scan code and the first event type by invoking the interface comprises:

responding, by the second electronic device, to the key scan code and the first event type by invoking a system interface.

7. The method according to claim 5, wherein the responding based on the key scan code and the first event type by invoking the interface comprises:

transmitting, by the second electronic device, the key scan code and the first event type to an application program for responding by using an event distribution program.

8. The method according to claim 5, wherein the obtaining the key scan code and the first event type according to the event information comprises:

obtaining, by the second electronic device, the key scan code and the first event type by parsing the event information based on a first transmission format, wherein the first transmission format is a key event transmission format predefined by the first electronic device and the second electronic device.

9. The method according to claim 1, wherein the first event is an operation event on a keyboard of a Windows system, and a key operated by the first event is a key included in a keyboard of a Windows system but not included in a keyboard of an Android system.

10. The method according to claim 1, wherein the event types includes: a keyboard down event, a keyboard up event, a wheel vertical movement event, or a wheel horizontal movement event.

11. A first electronic device, comprising:
one or more memories storing one or more programs; and
one or more processors, wherein when the one or more programs are executed by the one or more processors, the first electronic device is enabled to perform operations comprising:
detecting a first event of a first input device or a second input device, wherein the first electronic device is connected to the first input device, and the first electronic device is connected to the second input device;
determining a current focus device of the first input device;
generating event information based on an event type of the first event and a first mapping relationship based on the focus device being a second electronic device, wherein the event information comprises a key scan code and a first event type, the first mapping relationship comprises a correspondence between the key scan code and a first key code, the key scan code is a corresponding key scan code of the first event under a second operating system running on the second electronic device, and the first key code is a key code of the first event under a first operating system running on the first electronic device; and
transmitting the event information to the second electronic device, wherein the event information is used for converting the first event into an event under the second operating system.

12. A non-transitory computer-readable storage medium storing a computer program that, when executed by a processor in a first electronic device, causes the first electronic device to perform operations comprising:
detecting a first event of a first input device or a second input device, wherein the first electronic device is connected to the first input device, and the first electronic device is connected to the second input device;
determining a current focus device of the first input device;
generating event information based on an event type of the first event and a first mapping relationship based on the focus device being a second electronic device, wherein the event information comprises a key scan code and a first event type, the first mapping relationship comprises a correspondence between the key scan code and a first key code, the key scan code is a corresponding key scan code of the first event under a second operating system running on the second electronic device, and the first key code is a key code of the first event under a first operating system running on the first electronic device; and
transmitting the event information to the second electronic device, wherein the event information is used for converting the first event into an event under the second operating system.

* * * * *